J. M. RIEDY.
TOOL HOLDER.
APPLICATION FILED MAR. 31, 1917.
1,262,701. Patented Apr. 16, 1918.
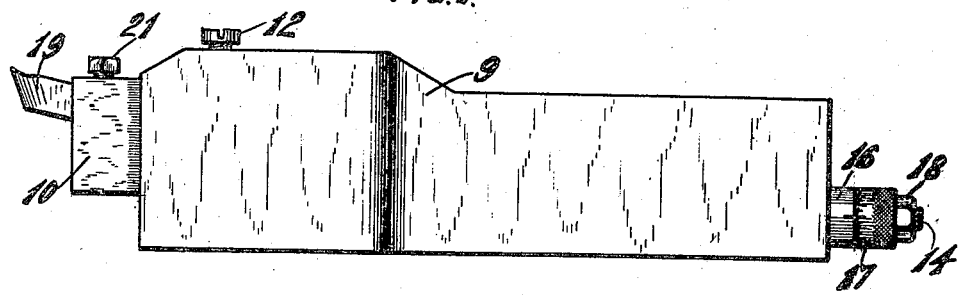
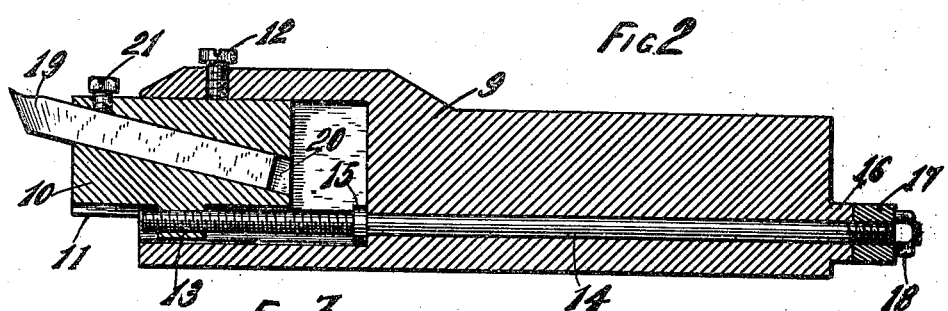
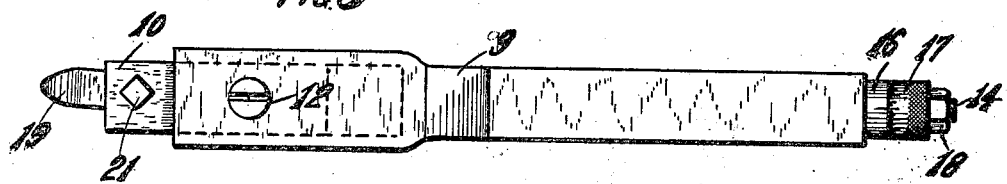
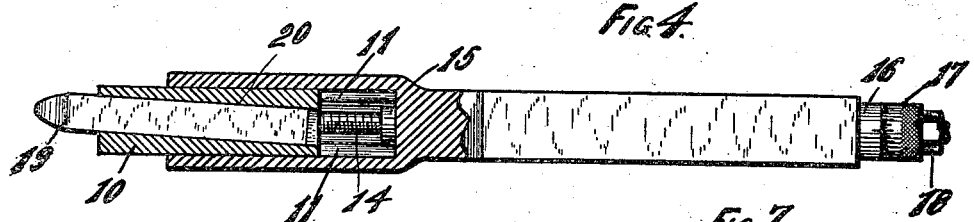
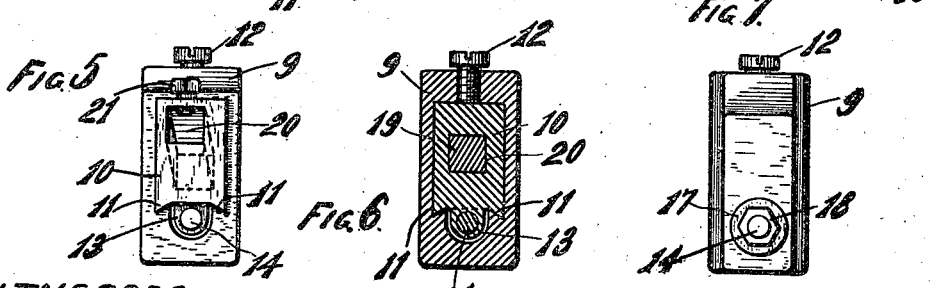
WITNESSES
INVENTOR
Joseph M. Riedy
By R. S. Caldwell
ATTORNEY

UNITED STATES PATENT OFFICE.

JOSEPH M. RIEDY, OF MILWAUKEE, WISCONSIN.

TOOL-HOLDER.

1,262,701.  Specification of Letters Patent.  Patented Apr. 16, 1918.

Application filed March 31, 1917. Serial No. 158,915.

*To all whom it may concern:*

Be it known that I, JOSEPH M. RIEDY, a citizen of the United States, and resident of Milwaukee, in the county of Milwaukee and State of Wisconsin, have invented new and useful Improvements in Tool-Holders, of which the following is a description, reference being had to the accompanying drawings, which are a part of this specification.

This invention relates to tool holders for lathes and the like and has for its object to provide for independent adjustment of the tool within the holder whereby the tool may be more accurately positioned, especially where several tools are working side by side and it is desired to adjust one tool without a corresponding adjustment of the others.

With the above and other objects in view the invention consists in the tool holder as herein claimed and all equivalents.

Referring to the accompanying drawings, in which like characters of reference indicate like parts in the different views:

Figure 1 is a side view of a tool holder constructed in accordance with this invention;

Fig. 2 is a longitudinal sectional view thereof;

Fig. 3 is a plan view thereof;

Fig. 4 is a sectional plan view;

Fig. 5 is an end view with the tool removed;

Fig. 6 is a transverse sectional view; and,

Fig. 7 is a rear end view.

In these drawings 9 indicates the tool holder proper which consists of a shank portion, rectangular in cross section, to be clamped within the ordinary tool post of a lathe or shaper or other metal working machine, and having an enlarged head portion containing a cavity or recess forming a casing for a tool carrying block 10 which is slidably mounted therein. As most clearly seen in Figs. 5 and 6, the block 10 is nearly rectangular in cross section but its lower edge is formed by a pair of parallel flanges 11 with their outer edges flush with the sides of the block and their inner edges inclined toward each other, while the shape of the opening or recess in the head of the tool holder 9 is such that the block fits closely therein. A set screw 12 threaded through the upper wall of said head is adapted to engage the block and force it downwardly into tight fitting clamping engagement with the inclined guide surfaces of the head with which the parallel flanges fit to firmly hold the block in its adjustment. The inclined guide surfaces for the flanges 11 serve to center the block within the holder under the pressure of the set screw and prevent it from displacement by lateral play. On the bottom of the block 10 is a downwardly projecting lug 13 through which is threaded an adjusting screw 14 which passes longitudinally through the tool holder with a shoulder 15 bearing against the end wall of the opening in the head of the tool holder. The bottom of the opening in the head of the tool holder is channeled between the inner bearing surfaces to permit of the longitudinal travel of the lug 13, and the rear end of the tool holder is provided with a boss 16 through which the screw spindle 14 projects. A calibrated nut 17 is threaded on the projecting end of the screw spindle 14 and is locked thereon by the pressure of a jam-nut 18. The nut 17 is preferably knurled and constitutes the means for turning the screw spindle 14 for sliding the block 10 in its guide ways in the head of the holder, the calibration marks on the nut being read with relation to a mark on the boss 16 for accomplishing close adjustment of the tool.

The tool 19 fits within an inclined and oblique opening 20 through the block 10 and is held in place by means of a set screw 21. The inclination given to the tool because of the direction of the opening 20 enables the tool to better withstand the stress due to the cutting operation, the downward movement of the work at the point of engagement of the tool imposing a downward stress upon the tool which the tool can better resist when held in an inclined position than when held in a horizontal position, as the tool when inclined takes the stress more nearly in a longitudinal direction. The same is true of the oblique position of the tool for it enables the stress due to the feeding action of the tool as in cutting screw threads to be taken by the tool in a longitudinal direction.

In operation the tool holder of this invention is mounted on the lathe carriage by having its shank clamped within the tool post as usual and with the tool clamped within the adjustable block 10 it is adjusted with relation to the work by means of the usual adjusting screw on the lathe carriage and is then set in motion by engaging the clutch of the feed screw. For succeeding cuts increasing the depth of the screw thread or other cut, the adjustments are made by the turning of the nut 17 to slide the block 10 forward a predetermined distance accurately measured by the micrometer calibrations on said adjusting nut so that the depth of cut of the tool will be exact. The adjustment of the tool by means of the screw spindle 14 is particularly valuable in cases where a plurality of cutting tools is carried by the carriage. Though the tools may be originally set so that each takes the desired cut, it will be found that by unequal wear or for other reasons one tool will not do its share and an adjustment of the carriage to advance it toward the work would cause the other tool to cut too deeply into the work. The only former remedy consists in releasing the tool from the tool post and readjusting it therein, which requires a considerable loss of time. By adjusting the tool by means of the screw spindle of the tool holder of this invention its individual adjustment is accomplished without changing the tool post and consequently without such loss of time.

The oppositely inclined ways on which the tool block 10 slides within the head of the tool holder assures the absence of play that might cause the tool to chatter and spoil the work, and still allows for clearance at the sides that will permit the block to readily slide to accomplish the adjustment.

By means of this device a great saving in time is obtained and the device is so constructed that it is strong and durable and not liable to get out of order.

What I claim as new and desire to secure by Letters Patent is:

1. A tool holder, comprising a shank having a recess in one end, oppositely inclined parallel guide surfaces along the bottom of the recess, a tool carrying block slidably fitting in the recess and bearing on said guide surfaces to be centered thereby to clear the side walls of the recess, a set screw bearing on the block to force it into engagement with the inclined guide surfaces, and means for sliding the block within the recess.

2. A tool holder, comprising a shank having a recess at one end forming a housing, a tool carrying block slidably mounted within the housing and having parallel flanges at its lower edge with their inner faces inclined and bearing against correspondingly inclined surfaces in the bottom of the recess, a set screw threaded in the top of the housing and engaging the block, a lug projecting from the bottom of the block and into a channel between the inclined bearing surfaces at the bottom of the recess, a screw spindle passing through the shank and having a shouldered threaded portion within said channel with threaded engagement with the lug of the block, and calibrated means on the end of the spindle for turning the spindle to adjust the block longitudinally within the housing.

In testimony whereof, I affix my signature, in presence of two witnesses.

JOSEPH M. RIEDY.

Witnesses:
R. S. C. CALDWELL,
H. D. CHASE.